United States Patent
Mohanty et al.

(10) Patent No.: US 8,150,202 B2
(45) Date of Patent: Apr. 3, 2012

(54) GAUSSIAN MIXTURE MODEL BASED ILLUMINATION NORMALIZATION FOR GLOBAL ENHANCEMENT

(75) Inventors: Kamini Kanta Mohanty, Bhubaneswar (IN); Mahesh Kumar Gellaboina, Kurnool (IN); Jeremy Craig Wilson, Delta (CA)

(73) Assignee: Honeywell International Inc., Morristown, NJ (US)

( * ) Notice: Subject to any disclaimer, the term of this patent is extended or adjusted under 35 U.S.C. 154(b) by 746 days.

(21) Appl. No.: 12/164,868

(22) Filed: Jun. 30, 2008

(65) Prior Publication Data

US 2011/0123133 A1 May 26, 2011

(51) Int. Cl.
*G06K 9/38* (2006.01)
(52) U.S. Cl. ....... 382/274; 382/260; 382/275; 358/3.26; 358/3.27; 358/463
(58) Field of Classification Search .................. 382/260, 382/274, 275; 358/3.26, 3.27, 463
See application file for complete search history.

(56) References Cited

U.S. PATENT DOCUMENTS

| | | | |
|---|---|---|---|
| 6,351,234 B1 | 2/2002 | Choy | |
| 6,463,173 B1 | 10/2002 | Tretter | |
| 6,615,162 B2* | 9/2003 | Bar-Or | 702/191 |
| 6,873,153 B2* | 3/2005 | Frydman | 324/307 |
| 7,006,881 B1* | 2/2006 | Hoffberg et al. | 700/83 |
| 7,050,652 B2* | 5/2006 | Stanek | 382/278 |
| 2005/0063603 A1 | 3/2005 | Wang et al. | |
| 2006/0210190 A1 | 9/2006 | Zhang et al. | |
| 2008/0084292 A1 | 4/2008 | DiPoala | |

FOREIGN PATENT DOCUMENTS

| | | |
|---|---|---|
| DE | 0 476 397 A1 | 3/1992 |
| EP | 0 556 898 A1 | 8/1993 |
| EP | 1 154 387 A2 | 11/2001 |

OTHER PUBLICATIONS

Rahman, Zia-ur et al., "Multi-Scale Retinex for Color Image Enhancement", Department of Computer Science, College of William and Mary and NASA Langley Research Center.

Rahman, Zia-ur et al., "Resiliency of the Multiscale Retinex Image Enhancement Algorithm", Department of Computer Science, College of William and Mary and NASA Langley Research Center.

(Continued)

*Primary Examiner* — Yosef Kassa
(74) *Attorney, Agent, or Firm* — Husch Blackwell

(57) ABSTRACT

A method is presented for enhancing an image from an initial image, comprising computing a first luminance level frequency distribution corresponding to plurality of pixel constructing said initial image, representing said first luminance level frequency distribution as a resultant of Gaussian model mixtures to assess relative utilization of overall luminance level across said initial image, computing a desired luminance level frequency distribution as a function of the relative utilization, computing a transfer function to adjust the first luminance level frequency distribution to an enhanced luminance level as a function of desired level frequency distribution estimation, and applying said transfer function globally to said initial image to provide an enhanced image is. The first luminance level can be adapted to be linearized in a logarithmic form. In one embodiment, the model comprises one or more Gaussian functions. The initial image can be a background image estimated from a sequence of images.

14 Claims, 14 Drawing Sheets

OTHER PUBLICATIONS

Chen, ZhiYu et al., "Gray-Level Grouping (GLG): An Automatic Method for Optimized Image Contrast Enhancement-Part I: The Basic Method", IEEE Transactions on Image Processing, vol. 15, No. 8, Aug. 2006, pp. 2290-2302.

Wongsritong, K. et al., "Contrast Enhancement Using Multipeak Histogram Equalization With Brightness Preserving", Proc. of 1998 IEEE Asia Pacific Conference on Circuits and Systems: Micro-electronics and Integration Systems, Chiangmai, Thailand, Nov. 24-27, 1998, pp. 455-458.

EP Search Report for application 09154254.8 dated Oct. 15, 2009 (7 pages) for companion EP case.

* cited by examiner

GAUSSIAN MIXTURE MODEL BASED ILLUMINATION NORMALIZATION FOR GLOBAL ENHANCEMENT

FIELD OF THE INVENTION

This invention relates generally to enhancing illumination conditions for video images. In particular, this invention relates to a method for using Gaussian mixture model based illumination normalization for global enhancement of video images.

BACKGROUND OF THE INVENTION

In any imaging system, dealing with contrast is always a compromise since the human visual system can accommodate a dynamic range much larger than one available in a typical imaging input device, such as a surveillance video camera. In low light conditions, video typically becomes very noisy, impairing the image quality and increasing the bit rate required for compressed video. While a noise filtering algorithm reduces video noise resulting in savings in terms of number of quantization bits, the algorithm typically fails to achieve the best visual appearance due to inadequate use of dynamic range.

Hence, a key issue in imaging is accommodating input scene brightness range within the available dynamic range of the imaging device, and it is desirable to have an automatic contrast adjustment. Enhancement algorithms capable of performing this brightness accommodation can be divided into two broad categories: global enhancement (point processes) and local enhancement (spatial processes). Under a global enhancement scheme, every pixel in the image is transformed independent of the values in its neighborhood. From a computational perspective, implementation of such algorithms is highly efficient because they can be applied using a look-up table derived from a transfer function. The transfer function itself is typically computed using global image statistics and a histogram.

In a local enhancement algorithm, the transformed output value of a given pixel depends not only on the input pixel value of the given pixel, but also on the input pixel values of the given pixel's neighbors. While local enhancement algorithms are capable of enhancing image details, they can be computationally expensive, and are prone to artifacts, that is, degradations and/or anomalies, due to enhancement of noise and ringing around edge features in the image. A key objective of local image enhancement is to increase variance of image details while preserving global variance.

The success of conventional global contrast enhancement techniques, namely linear stretching, logarithm transform, power-law transform, piece-wise linear transform, histogram equalization, etc., depends on appropriate parameter selection, which is most often carried out manually by an operator. Local enhancement algorithms selectively amplify local high frequency content, since useful information is mostly associated with edges and other micro details. The Retinex algorithm, based on the color constancy of human vision, is the most well known among the local enhancement schemes. A number of modifications have been proposed to the original single scale Retinex (SSR) algorithm. SSR computes output at every pixel as the difference between log intensity and log of a Gaussian blurred intensity. The output is clipped both at lower and upper saturation setting, enabling dynamic range compression. In one modification, a Multi-scale Retinex (MSR) algorithm, output is a weighted average of a number of SSR filters, each of which has good color constancy and dynamic range compression. Each of the SSR components of MSR uses a Gaussian blurring operator at different scale.

An Automatic Gain Controller (AGC) of a camera attempts to make full use of the available dynamic range. However, under low light conditions, presence of stray bright zones in the scene leads to inadequate use of the dynamic range resulting in a low entropy image. A histogram of such images is not continuous and each image contains a number of intensity clusters. An effective enhancement of such low light images has to get rid of the unused brightness zones. The preferred way to achieve this is to first reduce the contrast through an efficient packing of the histogram, by getting rid of unused zones in the image histogram, followed by a global contrast stretching. The Gray-Level Grouping (GLG) algorithm, proposed by Chen, Z., Abidi, B., Page, D. and Abidi, M., in *Gray Level Grouping (GLG): An Automatic Method for Optimized Image Contrast Enhancement—Part I: The Basic Method*, IEEE Trans. on Image Processing, Vol. 15, No. 8, pp. 2290-2302, August 2006, achieves this by dividing the histogram into a number of bins based on pre-defined criteria. These bins are distributed equally within the available dynamic range to achieve global enhancement.

Wongsritong K., Kittayaruasiriwat, K., Cheevasuvit, F., Dejhan, K. and Somboonkaew, A., in *Contrast Enhancement Using Multi-peak Histogram Equalization with Brightness Preserving*, Proc. of 1998 IEEE Asia Pacific Conference on Circuits and Systems: Micro-electronics and Integration Systems, Chiangmai, Thailand, Nov. 24-27, 1998, proposed a multi-peak histogram equalization algorithm that identifies individual peaks in image histogram, each of which are equalized independently.

In U.S. Patent Application Publication No. 2006/0210190, System and Method for Enhancing an Image, Zhang, Y., Taylor, M. and Perisho, R. A., 2006, disclose a zero crossing detector to identify the valleys and peaks in the histogram. These are subsequently used for enhancement using a stored heuristics. U.S. Patent Application Publication No. 2005/0063603, Video Data Enhancement Method, Wang, C., and Kao, C., disclose systematically partitioning the histogram into a number of zones. The enhancement function is constructed by taking into account the minimum, maximum and mean of each zone.

Tretter, D. R., 1995, System and Method for Histogram Based Image Contrast Enhancement, U.S. Pat. No. 6,463,173 B1, discloses partitioning of the histogram into a number of clusters with pattern matching for enhancement. Individual patterns can follow Gaussian or uniform distribution. Subsequently, histogram equalization is applied separately to each cluster.

In addition to spatial or within a frame luminance variation, enhancement of a video sequence has to take into account the temporal aspect of luminance variation, otherwise frame to frame flicker can occur. Commonly used approaches for video enhancement either maintain a frame to frame smooth transition in histogram or continuity in look-up table across the frames. Some authors deal with the flickering by attempting to compensate for the frame to frame luminance change. However, an overall solution addressing optimum usage of available dynamic range is needed.

SUMMARY OF THE INVENTION

The present invention advantageously provides a novel system and method for contrast enhancement. An innovative of GMM based enhancement adopts a generative framework to model luminance distribution to achieve optimum usage of available dynamic range. The problem of flickering under GMM based enhancement is controlled by computing the enhancement transfer or mapping function based on the luminance histogram of a background image that is made insensitive to short term luminance changes. The algorithm performing the enhancement function will be preferably realized in a Digital Signal Processor (DSP), where it will coexist with a number of other functionalities. Some of the desired functionalities of the inventive contrast enhancement algorithms are low computational complexity, fully automatic operation under varying noise/illumination conditions and camera types, free from artifacts, e.g. blurring, spatial distortion, white wash or black wash (saturation), and smooth control of brightness and/or contrast over time. The enhancement algorithm operates only on the luminance channel; the chrominance channels are left untouched.

The inventive technique for enhancing an image from an initial image comprises computing a first luminance level frequency distribution corresponding to the plurality of pixels constructing said initial image, representing said first luminance level frequency distribution as a resultant of Gaussian model mixtures to assess relative utilization of overall luminance level across said initial image, computing a desired luminance level frequency distribution as a function of the relative utilization, computing a transfer function to adjust the first luminance level frequency distribution to an enhanced luminance level as a function of desired level frequency distribution estimation, and applying said transfer function globally to said initial image to provide an enhanced image. In one embodiment, the method can include adapting the first luminance level to be linearized in a logarithmic form. In one embodiment, the model comprises one or more Gaussian functions. The initial image can be a background image estimated from a sequence of images. In one embodiment, the method can also comprise computing a plurality of transfer functions corresponding to each of a plurality of pixel zones, wherein each of said plurality of transfer functions can be applied globally to said initial image to provide a plurality of interim enhanced images, and the interim enhanced images can be blended to provide the enhanced image.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DISCLOSURE OF THE INVENTION

Figure 1:
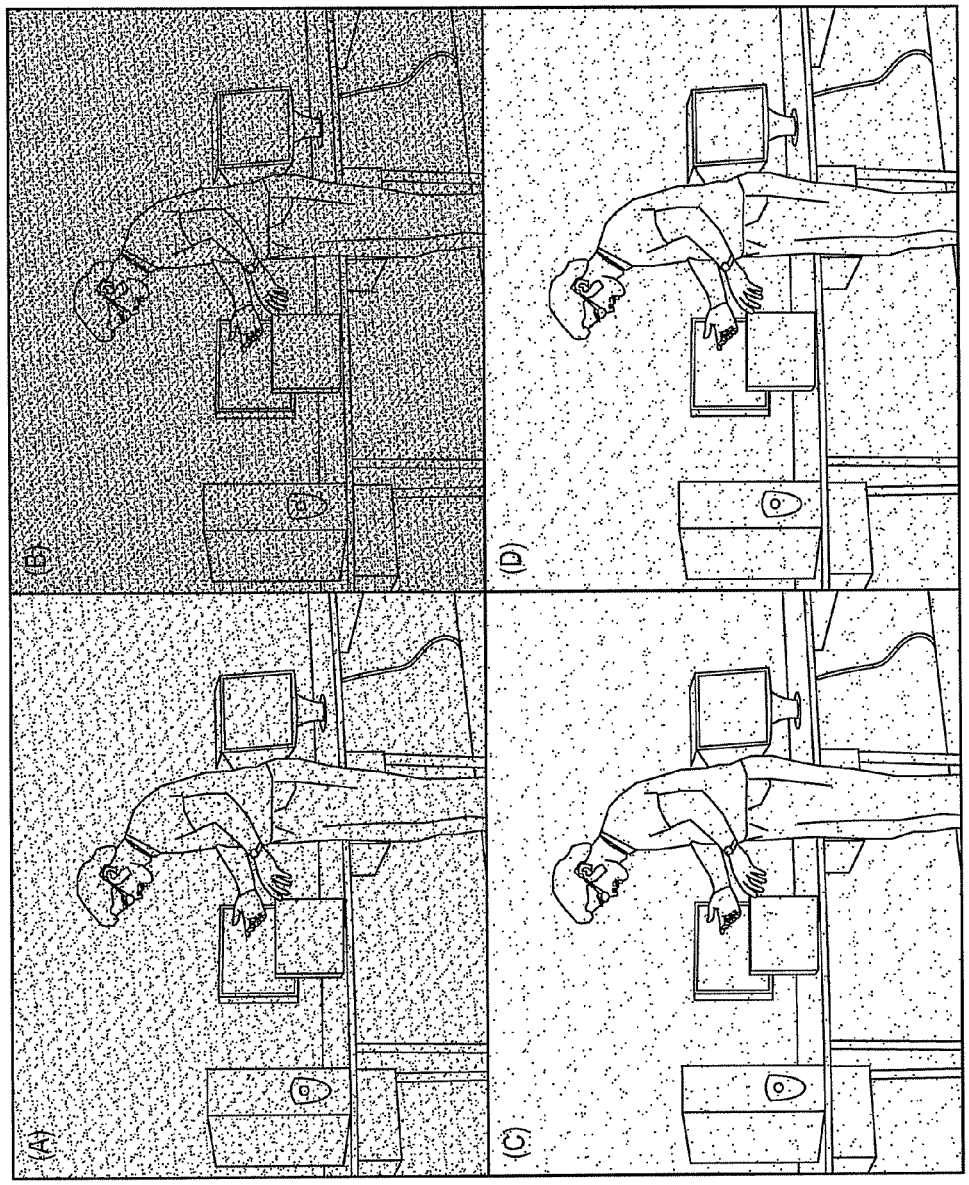
FIG. 1 is shows an image before and after noise filtering and enhancement in accordance with the present invention.

A system and method for image enhancement is presented. The enhancement scheme should not unduly enhance residual noise likely contained in low light images even after noise filtering. If the video is found to be noise free, the low light image enhancement portion of the scheme could be used as a standalone procedure. An image captured in low light condition before and after noise filtering is shown in panels (a) and (b) of FIG. 1. The enhancement of noisy and noise filtered images are shown in panels (c) and (d), respectively. Noise filtering opens up the scope of the enhancement scheme for further contrast enhancement.

Being a high frequency component, residual noise will get amplified through local enhancement. Hence, a global histogram based enhancement approach is preferred over local enhancement. Moreover, a global enhancement algorithm is computationally more efficient than local enhancement. Another requirement for enhancement is that under the condition of constant illumination, the enhancement scheme should maintain temporal continuity, thereby avoiding visual flickering. Maintaining a temporal continuity is easier under a global enhancement scheme as compared to local enhancement.

Color constancy in such schemes is maintained by enhancing the luminance channel only, without impacting the color components. In the present invention, the histogram of the luminance channel, or luminance histogram, is modeled as a Gaussian Mixture Model (GMM). Note that the luminance histogram is a frequency distribution. Individual Gaussians are readjusted to filter out any unutilized brightness zones. This readjustment of Gaussians amounts to brightening up the dark zones, and dimming the bright, saturated zones. A final global adjustment is performed to make full use of the dynamic range and remove any local intensity reversals. The entire enhancement, i.e. transfer or mapping function, is applied in the form of a modeled look-up table (LUT). The scheme can be implemented in an algorithm that is fully automatic and that can operate without any user intervention. The algorithm when applied on a full light condition does not introduce any saturation (white wash, black wash, etc.).

A histogram is used as measure of "relative utilization" of available luminance levels in the image. If the histogram is a perfect horizontal line, then utilization is 100%. If the histogram has many zones where the frequency value is low or zero, then utilization is low. The objective of enhancement is to increase the utilization of available luminance level, that is, desired utilization. This is done in the present inventive system by modeling the histogram in form of a number of Gaussians and then packing these Gaussians more efficiently. If Gaussians are widely separated, then utilization is low. If the Gaussians are closely spaced, then utilization is high.

Figure 2:
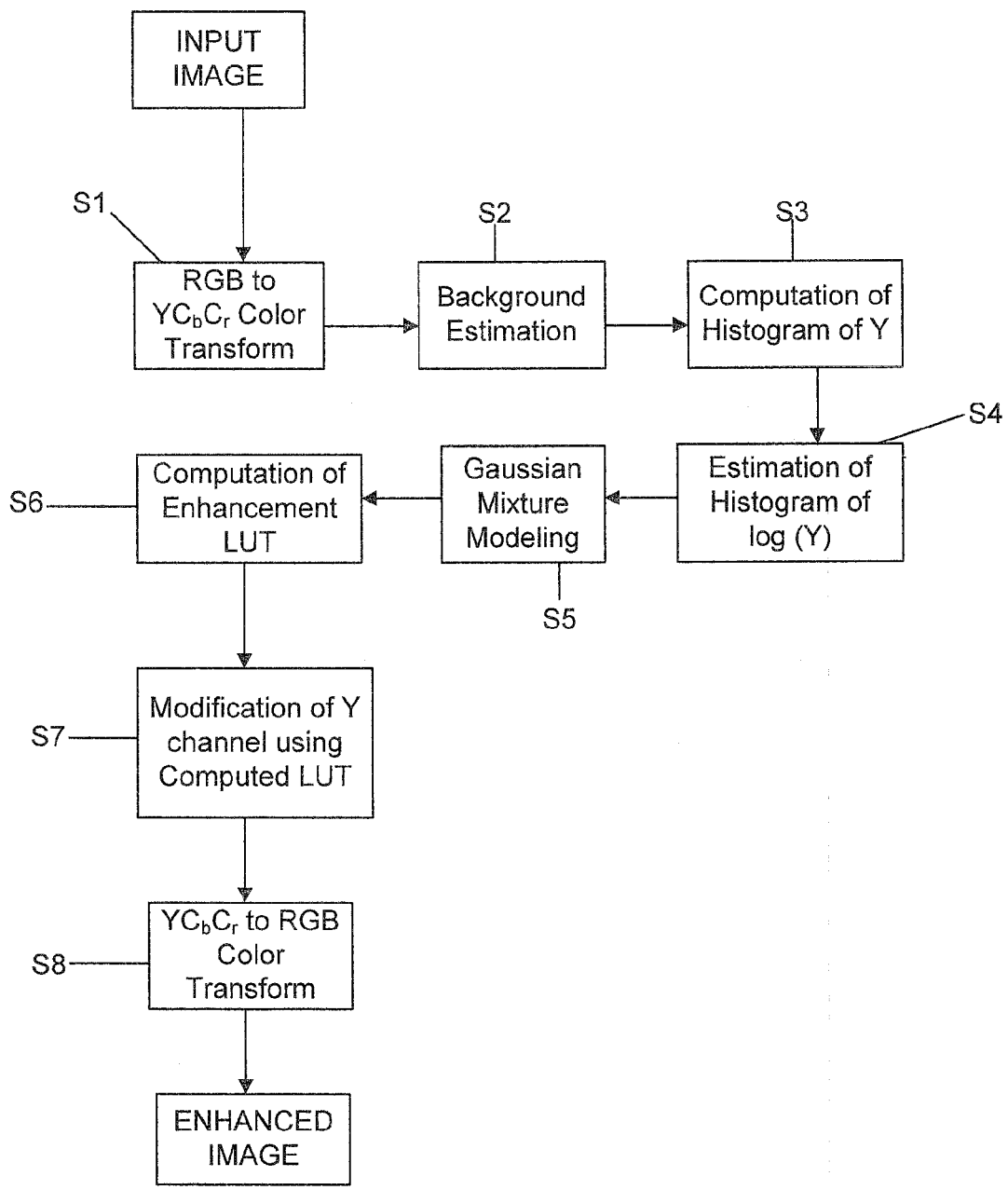
FIG. 2 is a flow chart of phases of an exemplary embodiment of the present invention.

A high level block diagram of the inventive GMM based enhancement algorithm is shown in FIG. 2. Step S1 performs a transformation from RGB color space to YCbCr color space. In Step S2, background estimation and/or modeling occurs. Step S3 performs histogram preprocessing and tail trimming, including the computation of the histogram of a first luminance level, e.g., Y. Log histogram is computed in step S4. Step S5 performs Gaussian Mixture Modeling (GMM). Enhancement LUT is computed is step S6, and modification of Y channel using the computed LUT occurs in step S7. In step S8, the transformation from the YCbCr domain back to RGB color space occurs. Each block or step is described in more detail below.

Step S1: Transformation from RGB Color Space to YCbCr Color Space

If the original image is available in color, that is, in the three channels, red, green, blue (RGB) or RGB color space, then this image should be transformed to the family of color spaces typically used in video and digital photography systems, e.g. $YC_bC_r$ domain, for filtering. As is known to those skilled in the art, the transformation from RGB color space to $YC_bC_r$ color space is typically achieved as follows:

$$Y = 0.299 \cdot R + 0.587 \cdot G + 0.114 \cdot B \quad (1\text{-}1)$$

$$C_b = -0.16874 \cdot R - 0.33126 \cdot G + 0.5 \cdot B + 128 \quad (1\text{-}2)$$

$$C_r = 0.5 \cdot R - 0.4189 \cdot G - 0.08131 \cdot B + 128 \quad (1\text{-}3)$$

In step S8, the inverse transformation occurs, enabling the processed image from the $YC_bC_r$ domain to be transformed to the three channel color domain. As is known to those skilled in the art, the inverse transformation from $YC_bC_r$ domain to RGB domain is typically achieved as follows:

$$B = Y + 1.772 \cdot (C_b - 128) \quad (2\text{-}1)$$

$$G = Y - 0.3441 \cdot (C_b - 128) - 0.7141 \cdot (C_r - 128) \quad (2\text{-}2)$$

$$R = Y + 1.402 \cdot (C_r - 128) \quad (2\text{-}3)$$

The algorithm can be implemented in any other polar color space such as YUV without any modification.

S2: Background Estimation/Modeling

The foreground activity occurring in a video image results in frame to frame variation in the image histogram. This leads to changes in the modeled LUT and, hence, to a frame to frame flickering. Besides, cameras using auto iris functionality bring in a change in luminance whenever a dark or bright object appears within the field of view. Contrast enhancement always exaggerates such subtle illumination changes and makes them more perceptible. Accordingly, unlike enhancement of isolated images from a still camera, a video enhancement scheme should also take care of the temporal aspect of luminance change. In the present invention, two preferred embodiments are described below to deal with foreground activity and subtle input illumination change. Under both embodiments, any permanent change in illumination or scene is gradually adopted as a part of the background model or intrinsic histogram.

Figure 3:
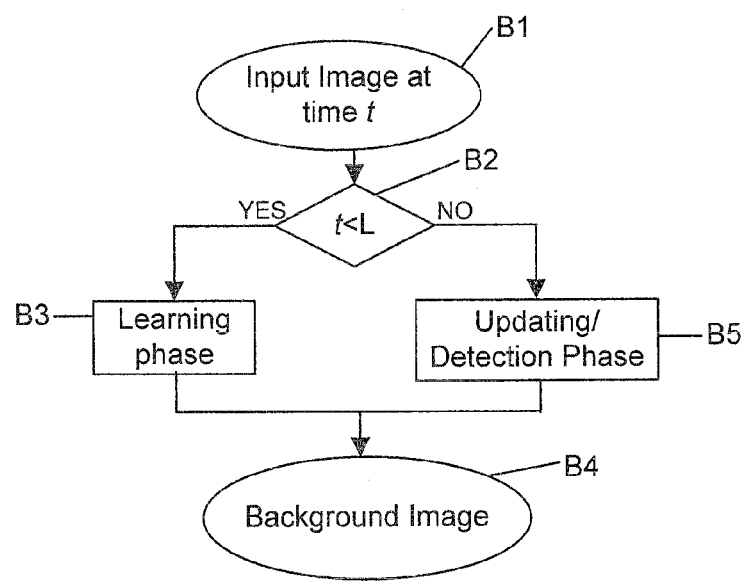
FIG. 3 is a flow chart of background modeling.

A flow chart for background modeling of one preferred embodiment is shown in FIG. 3. The process begins with an input image and terminates with a background image. Step B1 inputs the image at time t, Yt, that is, the Y channel at time t. If the time is less than the time length for learning (B2=YES), then the learning phase is performed in step B3, and the background image is output in step B4. Otherwise, if the time is greater than or equal to the time length for learning (B2=NO), then the updating/detection phase is performed in step B5. As with the learning phase, upon completion of the updating/detection phase, the background image is output in step B4.

In the first approach to "flicker control", "smoothing histogram across frames", the image histogram is smoothly updated across a sequence of frames to filter out any sudden change associated with foreground activity. This is achieved by maintaining an intrinsic histogram for the video sequence. At any time instance, an intrinsic histogram can be obtained by blending the current image histogram with a previously computed intrinsic histogram.

The histogram is a one-dimensional signal of 256 samples or bins with each sample representing the population of a given grey count. The mean and standard deviation of each sample is estimated recursively. The initial phase of a first few seconds, for example thirty frames, is treated as the learning phase and is used to compute the mean and standard deviation value of each histogram bin. The subsequent phase, called updating/detection phase, updates the mean and standard deviation of each bin. If a large number of histogram bins are continuously updated over a predefined number of frames, the change is attributed to permanent scene and/or illumination change. Under such circumstances, the intrinsic histogram is replaced by the current histogram and the standard deviation of each bin is re-estimated.

During the learning phase, the mean and standard deviation of each bin (x-value or x) is computed as, $$\bar{h}_0(x) = h_0(x) \quad (3\text{-}1)$$

$$\bar{h}_t(x) = \alpha_t h_t(x) + (1 - \alpha_t) \bar{h}_{t-1}(x) \quad (3\text{-}2)$$

$$\sigma_t^2(x) = \alpha_t [h_t(x) - \bar{h}_t(x)]^2 + (1 - \alpha_t) \sigma_{t-1}^2 \quad (3\text{-}3)$$

$$\alpha_t = 1 - \frac{1 - \rho}{L} t \quad (3\text{-}4)$$

$$\rho = 0.05 \quad (3\text{-}5)$$

$$L = 30 \quad (3\text{-}6)$$

where, $\bar{h}_t(x)$ represents background histogram at time t for luminance value x and $h_t(x)$ is the histogram of current luminance image at time t corresponding to a luminance value x.

During the updating/detection phase, the mean and standard deviation values for a bin (x) in a background histogram are updated only if the scene background contributes to the luminance count of the bin. A bin is associated with a background region if the difference between the frequency count of the current histogram and that of the background histogram of the particular bin is within a standard deviation limit. In addition, to accommodate any permanent scene change, including scene luminance, a separate array is used to accumulate all pixels that are consecutively categorized as foreground. A global scene change is inferred if the sum of the accumulation array exceeds a threshold, and this global scene change reinitiates a learning process. The computations are as follows:

$$\left.\begin{array}{l}\overline{h}_t(x) = \alpha h_t(x) + (1-\alpha)\overline{h}_{t-1}(x)\\ \sigma_t^2(x) = \alpha[h_t(x) - \overline{h}_t(x)]^2 + (1-\alpha)\sigma_{t-1}^2\\ p(x) = 0\\ \alpha = 0.05\end{array}\right\}\text{ if }x\text{ associated with scene background} \quad (4\text{-}1)$$

$$\left.\begin{array}{l}\overline{h}_t(x) = \overline{h}_{t-1}(x)\\ \sigma_t^2(x) = \sigma_{t-1}^2\\ p(x) = p(x) + 1\end{array}\right\}\text{ if }x\text{ associated with scene background} \quad (4\text{-}2)$$

A bin (x) is associated with scene background if $$|h_t(x) - \overline{h}_{t-1}(x)| \leq n\sigma_{t-1}(x)\text{ where }n=3 \quad (4\text{-}3)$$

where p(x) is an array that stores the update history of each bin. This is used to decide a global scene change. A global scene is assumed to have occurred if, $$\frac{1}{256}\sum_{x=1}^{256} p(x) > h_{thr} \quad (4\text{-}4)$$

where $h_{thr}=3.5$

In the second preferred embodiment for "flicker control", a background modeling algorithm is used to estimate a foreground-free background model that is used to compute an enhancement LUT. Any sophisticated background modeling technique can be used for computing this LUT. An exemplary embodiment uses an exponentially smoothed background model.

This background modeling approach for flicker control computes a background image for the video sequence, and this background image is used for histogram computation. The background model filters out both foreground activity and illumination fluctuation. However, any long term scene change is slowly adopted in the background model over time. This approach is the same as that for computing an intrinsic histogram discussed above. The only difference is that the intrinsic histogram deals with a one-dimensional signal, and the background modeling approach uses the entire Y channel.

Figure 4:
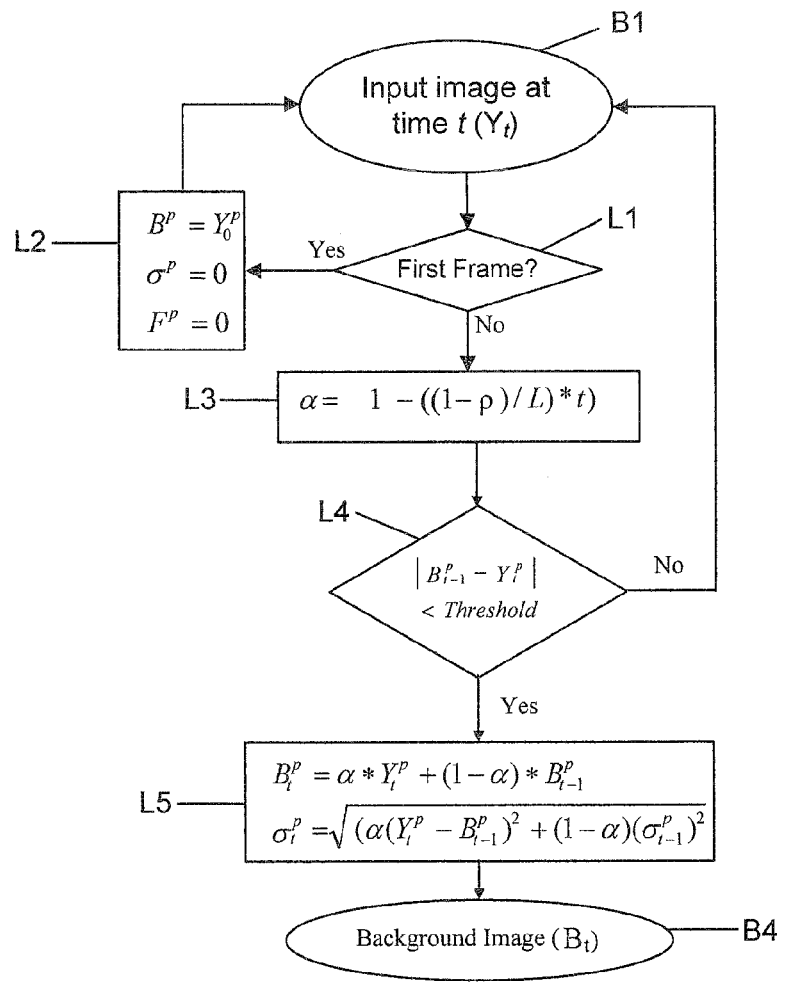
FIG. 4 is a flow chart of a learning phase in background modeling of the present invention.
Figure 5:
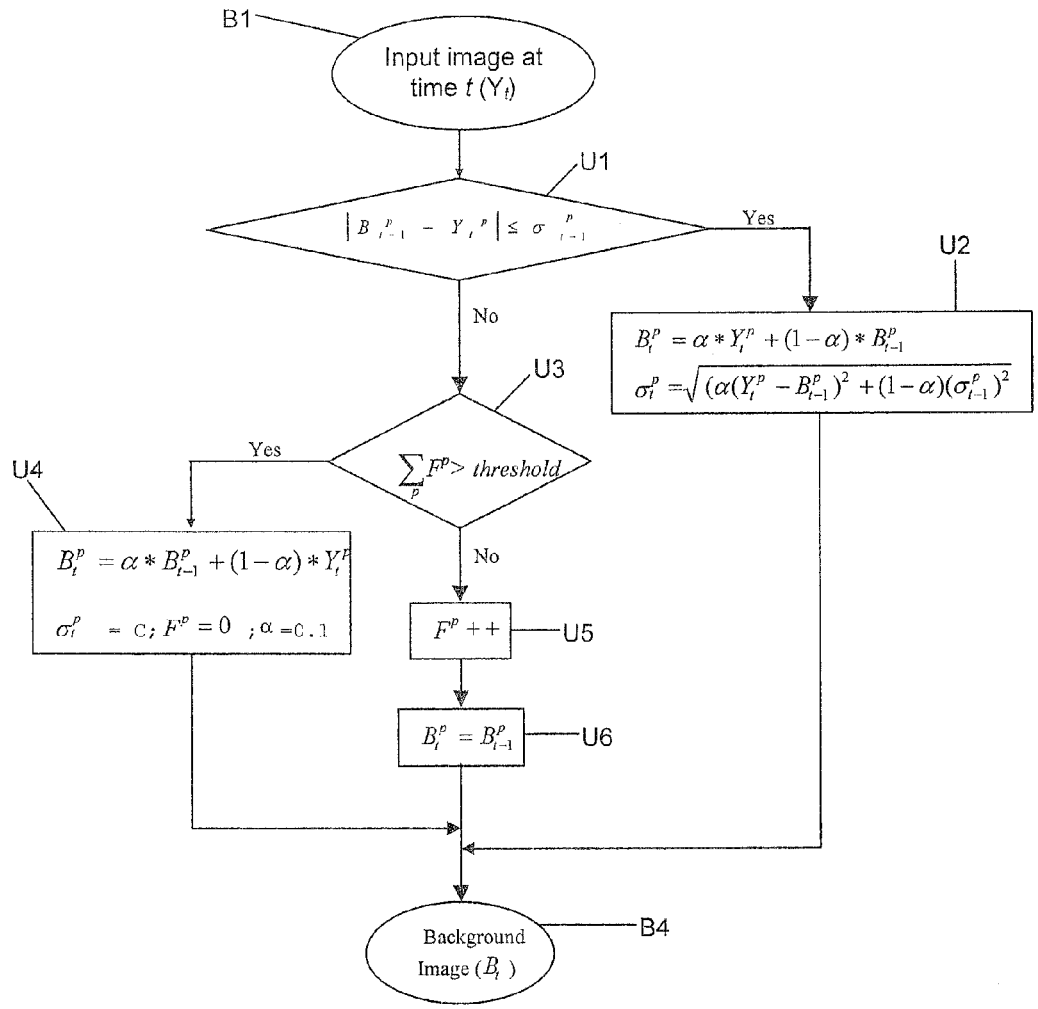
FIG. 5 is a flow chart of an updating/detection phase in background modeling of the present invention.

The learning and updating/detection phases of the exponential background modeling approach for flicker control are shown in FIGS. 4 and 5. The mean and standard deviation of Y value of each image pixel is computed during the learning phase, which is shown in FIG. 4. In step B1 (also shown in FIG. 3), the input image at time t, Yt, the channel Y at time t, is input. Time t can be the current time. If this is the first frame to be processed (L1=YES), then in step L2 the background image $B^p$ is initialized to $Y_0^p$, and the standard deviation ($\sigma$) and foreground accumulation (F) are set to zero (0), and the process returns to step B1. If this is not the first frame (L1=NO), then the learning rate (a) is computed in step L3. If the threshold is not exceeded (L2=NO), then the process returns to step B1 and continues. If the threshold is exceeded (L4=YES), then in step L5 the background image at time t (BP) and the standard deviation (a) are calculated and the background image is output in step B4 (also shown in FIG. 3).

During the updating/detection phase, a background pixel's mean and standard deviation values are updated based on the linear combination of background Y values and current image Y values. More weighting is given to the background Y value, if the pixel is classified as background. The details of the updating/detection phase are shown in FIG. 5. In step B1 (also shown in FIG. 3), the input image at time t, Yt, the channel Y at time t, is input. If the difference between the background image for a pixel and its Y channel is less than its standard deviation (U1=YES), then in step U2 a new background Y value and standard deviation are computed, giving more weight to the background Y value. The background image is output in step B4 (also shown in FIG. 3).

If not (U1=NO), then if the foreground accumulation is greater than a threshold (U3=YES), then a new background image and standard deviation are computed in step U4, and the background image is output in step B4. If the foreground accumulation is less than the threshold (U3=NO), then the foreground accumulation is increased in step U5 and the pixel at the next time is obtained in step U6. The background image is output in step B4.

Figure 6:
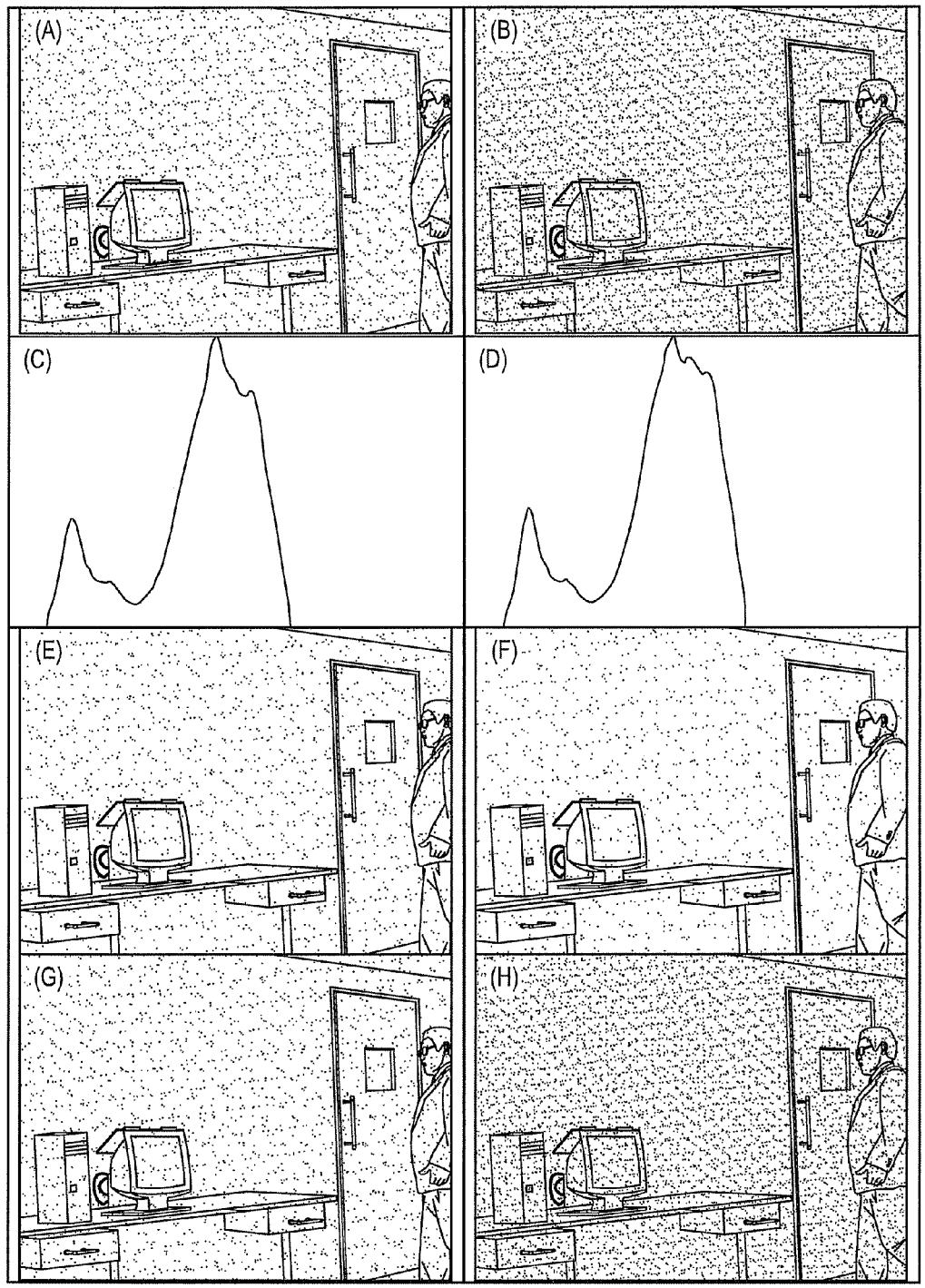
FIG. 6 shows images and related histograms before and after enhancement in accordance with the present invention.

FIG. 6 shows the effect of using the background image histogram in place of the original image histograms. In FIG. 6, panels (a) and (b) show two consecutive frames having minor fluctuations in brightness. Panels (c) and (d) show histograms corresponding to the input frames of panels (a) and (b). Panels (e) and (f) show the input frames enhanced using their original histograms, while panels (g) and (h) show the input frames enhanced using the histogram of the background. Use of the histogram of background image in place of the histogram of the original input frames results in a flicker free smooth enhancement.

Step S3: Histogram Preprocessing and Tail Trimming/Computation of Histogram of Y The histogram is always affected by various sources of image noise. Moreover, a smooth function always results in more efficient GMM modeling. Hence, the histogram is filtered using a number of consecutive passes of a moving average filter. A preferred implementation uses three consecutive passes of a 3-point moving average filter. The tails of the histogram are often associated with stray illumination and noise. Removing insignificant histogram tails and computing a modified input dynamic range results in more effective enhancement. The preferred approach is to remove a fixed fraction (typically 1/500) of population from both ends of histograms. A trimming of 1/500 of tail at both ends is used by default. This is referred to as the first pass trimming. If fewer than a threshold number of bins, for example, ten bins, are trimmed, then the trim fraction is increased and additional trimming is carried out. This additional trimming is referred to as an optional second pass of trimming and is used to remove the effect of darkest and brightest regions. The maximum trimming is restricted to 1/250 of population.

Figure 7:
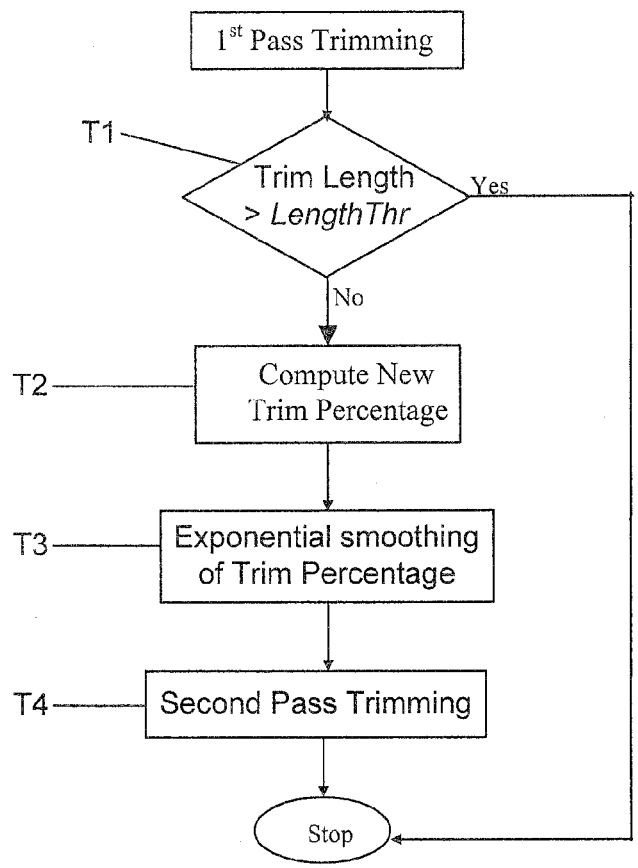
FIG. 7 is a flow chart of a trimming approach of the present invention.

An overall flow chart for trimming both ends of the histogram is shown in FIG. 7. In step T1, the trim length is compared to a threshold length (LengthThr). If the trim length is less than the threshold (T1=NO), a new trim percentage is computed in step T2. Next, exponential smoothing of the trim percentage occurs in step T3, and then second pass trimming is performed in step T4, and trimming is complete. If the trim length is greater than the threshold (T1=YES), trimming is complete.

There is also a need to maintain a frame to frame continuity of trim factor to avoid flicker. This is achieved by using a linear combination of the currently estimated trim factor with that used for the previous frame. The second pass trimming ($tp_t^2$) for a given frame is defined as a linear function of bin span of first pass trimming, i.e. the number of histogram bins over which the first pass trimming bins spread.

$$tp_t^2 = m \cdot tb_{span} + c \qquad (5)$$

where, m=0.3 is an empirical constant, c=200 is the minimum second pass trim and $tb_{span}$ is the number of bins over which the first pass trimming spreads.

The final second pass trimming ($\overline{tp}_t^2$) factor applied to the frame at time t is given by, $$\overline{tp}_t^2 = \beta \cdot tp_t^2 + (1-\beta) \cdot \overline{tp}_{t-1}^2 \qquad (6)$$

where β=0.1

Step S4: Log Histogram Computation

Gaussian mixture modeling of histogram and enhancement are performed in the log luminance domain This requires computing the log of every pixel in the Y channel and then building a histogram from the log transformed image. Computing the log of every luminance pixel is expensive. A computationally inexpensive equivalent is to estimate the histogram of log(Y) channel using the histogram of the Y channel. This is achieved by transforming the x-axis of the histogram into the log domain and stretching the minimum and maximum limits between 0 and 255.

If $h_{min}$ and $h_{max}$ represent minimum and maximum luminance values in the scene, a log transform of original luminance counts ($h_x$) to a log luminance scale ($h_y$) is given by $$h_y = 255(h_x - h_{min})/(h_{max} - h_{min}) \qquad (7)$$

Figure 8:
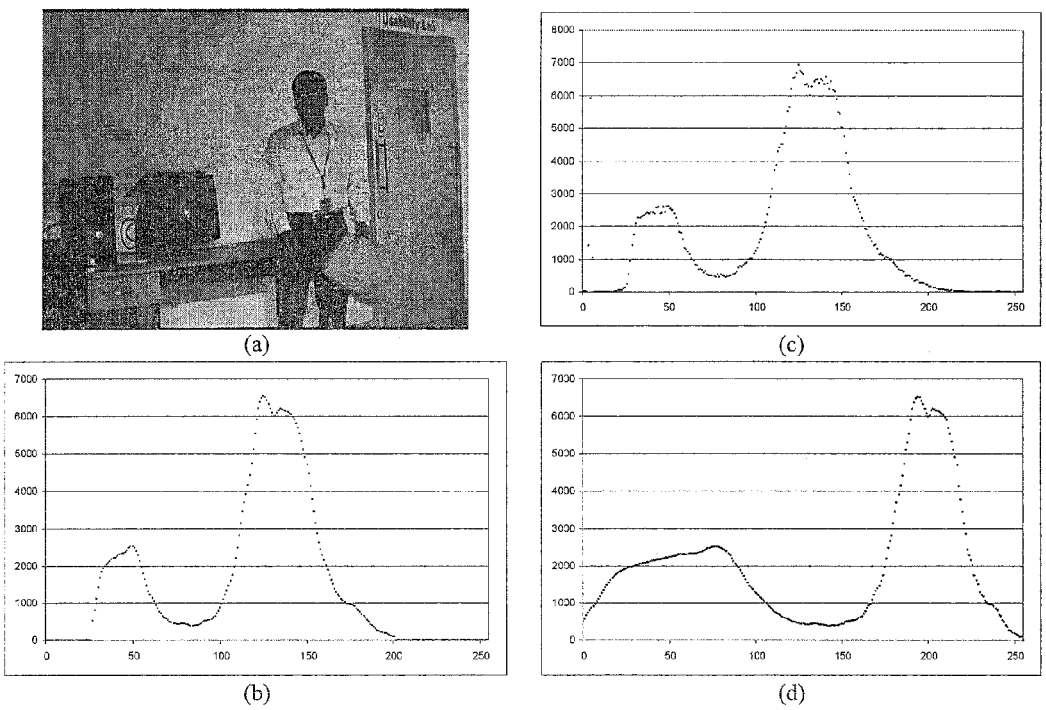
FIG. 8 shows an image and related histograms before and after enhancement in accordance with the present invention.
Figure 8A:
Figure 8B:
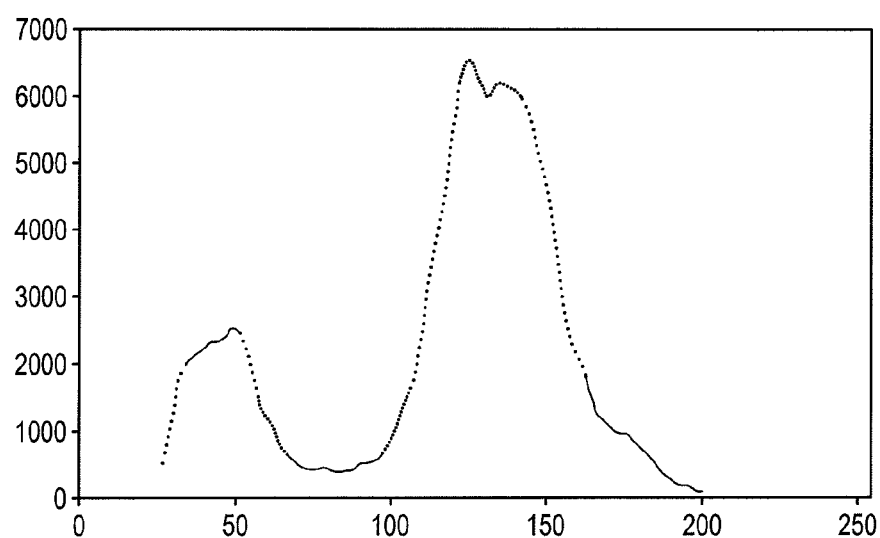
Figure 8C:
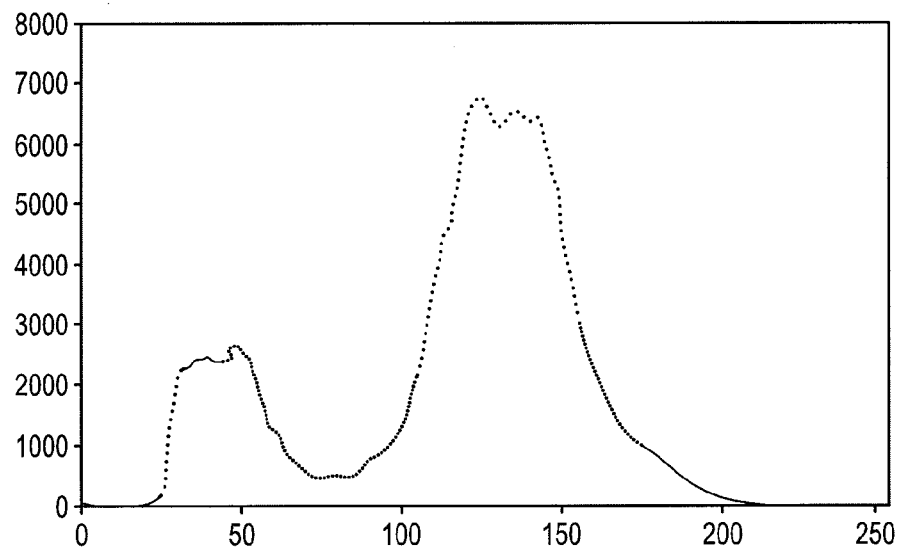
Figure 8D:
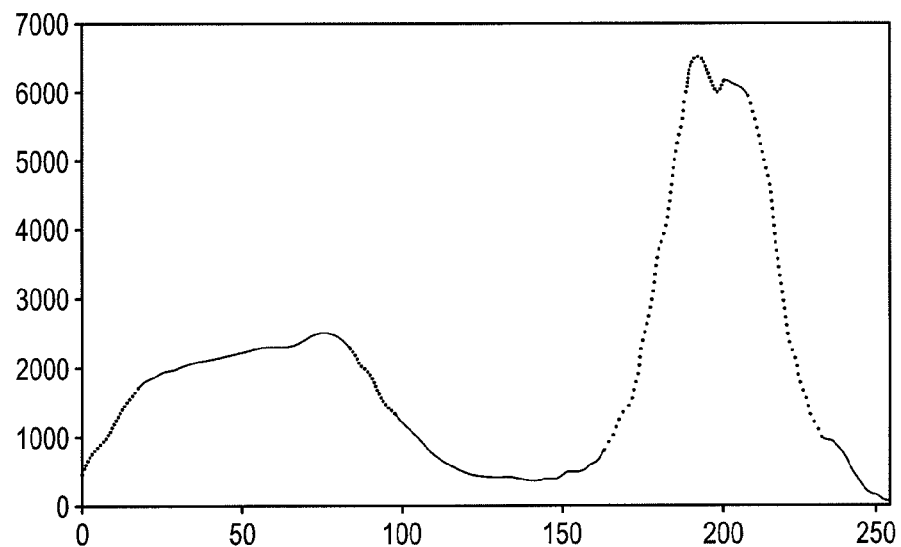

$h_y$ values are floating point values and contain many gaps while the original luminance observations $h_x$ are at discrete intervals and fairly continuous. A linear interpolation can be used to construct a histogram with discrete spacing. An image, its Y channel histogram, and reconstructed log(Y) histograms are shown in FIG. 8. Panel (a) of FIG. 8 shows a low light image requiring enhancement. Panel (b) shows the original histogram of Y channel without smoothing and tail trimming. The preprocessed histogram is shown in panel (c), and the log(Y) histogram estimated from the histogram of Y channel is shown in panel (d). In the log histogram, the lower brightness zones are expanded, while the higher brightness zones are compressed.

Step S5: Gaussian Mixture Modeling

As is known in the state of the art, Gaussian mixture modeling, or using a Gaussian Mixture Model (GMM), expresses the histogram as a sum of Gaussians. An "expectation maximization" algorithm can perform modeling for GMM. The GMM of the histogram results in a number of Gaussians, each characterized by its mean, standard deviation and weight. The GMM of the histogram H is given by, $$H = \sum_{i=1}^{K} \omega_i N_i(\mu_i, \sigma_i) \qquad (8)$$

where K is the number of Gaussians, and $\omega_i$ is the weight assigned to the $i^{th}$ Gaussian.

The expectation maximization algorithm cannot discover the best choice for the number of Gaussian components required to represent the histogram, so in this inventive system and method an iterative approach has been adopted to find the number of Gaussian components in the histogram. Initially the histogram is modeled for a fairly large number of Gaussians, typically five, and the components are then analyzed to find the number of valid Gaussians. A valid Gaussian is one that has a weight larger than a given threshold (typically 0.05) and standard deviation greater than another given threshold (taken as three by default). A second pass of GMM is carried out for the valid number of Gaussians.

Figure 9:
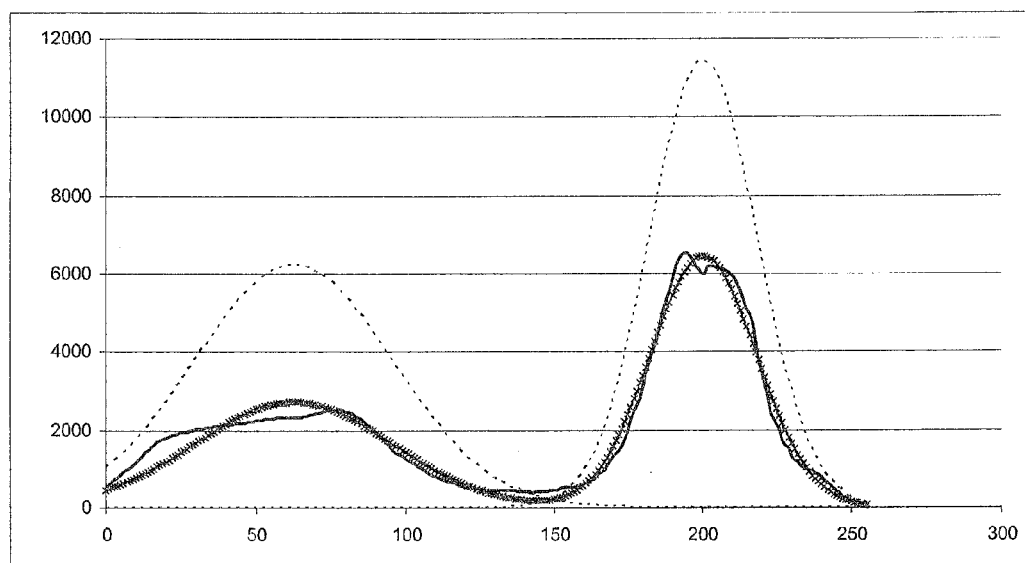
FIG. 9 shows GMM modeling results in accordance with the present invention.

FIG. 9 shows an image histogram along with Gaussian components and modeled histogram. The dark solid line shows the original histogram being modeled, the dashed lines show two Gaussian components of the histogram, and light hashed line shows the histogram reconstructed using the two Gaussian components.

Step S6: Computation of Look-Up Table (LUT)

A key to GMM based global enhancement is getting rid of unutilized brightness zones in the image histogram. This is achieved inventively by packing the Gaussian components more efficiently. The individual Gaussian members are translated towards lower brightness without adjusting their standard deviation. The amount of translation is directly proportional to the mean of the Gaussian component. The translation alters the Gaussian component's relative spacing and results in more efficient packing. A translated Gaussian is given by $N(\mu'_i, \sigma_i)$, where $$\mu'_i = \exp(-\mu_i/255)/2 \qquad (9\text{-}1)$$

The new transformed Histogram (H') as a result of this Gaussian translation is given by, $$H' = \sum_{i=1}^{K} \omega_i N_i(\mu'_i, \sigma_i) \qquad (9\text{-}2)$$

In the preferred embodiment, the standard deviations ($\sigma_i$) of the Gaussians are not modified. Altering the standard deviation of the Gaussians can bring in additional contrast enhancement within each brightness zone. However, this is often introduces additional artifacts.

The objective is to construct a transfer function which, when applied to the original luminance values, will result in an image histogram of H'. The transfer function $f(x)$ that needs to be applied on the input image is given by $$f(x) = x - \alpha \cdot t \qquad (9\text{-}3)$$

$$t = \sum_{i=1}^{K} p_i(x)\mu_i \qquad (9\text{-}4)$$

$$\alpha = \frac{1}{2}e^{-t/255} \qquad (9\text{-}5)$$

where $p_i(x)$ is the probability of x belonging to $i^{th}$ Gaussian component; and x stands for input Y value, while $f(x)$ stands for enhanced Y value.

The input image Y value can take only values in the range of 0 to 255. Hence, the function $f(x)$ is evaluated for all integer values of x in range of 0 to 255. This evaluation is stored in a table having two columns; the first column contains x values and second column consists of $f(x)$ values. In a typical computer data structure, $f(x)$ values are stored in a one dimensional array having 255 elements, referred to as a look-up table or LUT. Storing the data as an array or in a data structure saves time and overhead in terms of computation. If an input Y value, e.g. one hundred, occurs in an image one thousand (1000) times, instead of computing an $f(x)$ value 1000 times, the $f(x)$ value stored in LUT is used.

However, the above transfer function may contain some intensity reversals and negative values. This is avoided by taking the cumulative function of the transfer function and stretching it to fit within an output dynamic range.

Cumulative function $F(x)$ of function $f(x)$ is defined as, $$F(x) = \sum_{x=0}^{x} f(x) \quad (9\text{-}6)$$

The output dynamic range can be either the same as that of the input, or the entire available dynamic range spanning from 0 to 255, or a function of input dynamic range based on a heuristic. Use of an output dynamic range the same as that of the input does not provide significant enhancement gain, while using the full dynamic range often results in unwanted saturation. The output dynamic range is a function of input dynamic range, mean scene luminance, and slope of leading and trailing edges. A scene which is darker than an average scene, i.e. mean luminance is lower than 127, provides an opportunity for white saturation. In such cases, the output Y channel upper limit is increased beyond the input grey upper limit towards 255. The magnitude of increase is proportional to degree of darkness. However, such whitening is applied only if the light end slope is lower than a threshold.

Similarly, a scene may be darkened if the scene is brighter than an average scene, i.e. mean luminance is higher than 127. In such cases, the output Y channel lower limit ($Y_{out}^{min}$) is decreased below input grey lower limit, that is, the minimum Y channel value in the input image ($Y_{in}^{min}$), towards 0. The magnitude of decrease is proportional to the degree of lightness. Again, such darkening is applied only if the dark end slope is lower than a threshold ($slope_{thr}$). The slopes of both dark end and light end slopes of the histogram are estimated in a least square sense. The output maximum ($Y_{out}^{max}$) and minimum ($Y_{out}^{min}$) are given by, $$\left.\begin{array}{l} Y_{out}^{min} = Y_{in}^{min} \times s \\ Y_{out}^{min} = Y_{in}^{min} \end{array}\right] \begin{array}{l} \text{if } \overline{Y} > 127\ \&\ slope_{dark} < slope_{thr} \\ \text{otherwise} \end{array} \quad (10\text{-}1)$$

$$\left.\begin{array}{l} Y_{out}^{max} = Y_{in}^{max} \times (1-s) + 255 \times s \\ Y_{out}^{max} = Y_{in}^{max} \end{array}\right] \begin{array}{l} \text{if } \overline{Y} < 127\ \&\ slope_{light} < slope_{thr} \\ \text{otherwise} \end{array} \quad (10\text{-}2)$$

where, $Y_{in}^{max}$ and $Y_{in}^{min}$ are the maximum and minimum Y channel values for the input scene, $\overline{Y}$ is the mean scene luminance;

$slope_{light}$ and $slope_{dark}$ are the slopes in the light and dark ends of the histogram estimated in a least square sense.

For calculating $Slope_{dark}$, the first or lowest thirty values of histogram are taken from $Y_{in}^{min}$ and fit to a straight line using a Least Mean Square algorithm. From the straight line equation, the slope is determined. Similarly, for calculating $Slope_{light}$, the last or largest thirty values of histogram up to $Y_{in}^{max}$ are taken, and fit to a straight line from which slope is determined The scaling factor s is given by, $$s = \frac{1}{\left(1 + e^{\frac{-(127-\overline{Y})}{k}}\right)} \quad (10\text{-}3)$$

where k=32 is a factor that controls the sensitivity.

Step S7: Modification of Y Channel Using the Computed LUT

Figure 10A:
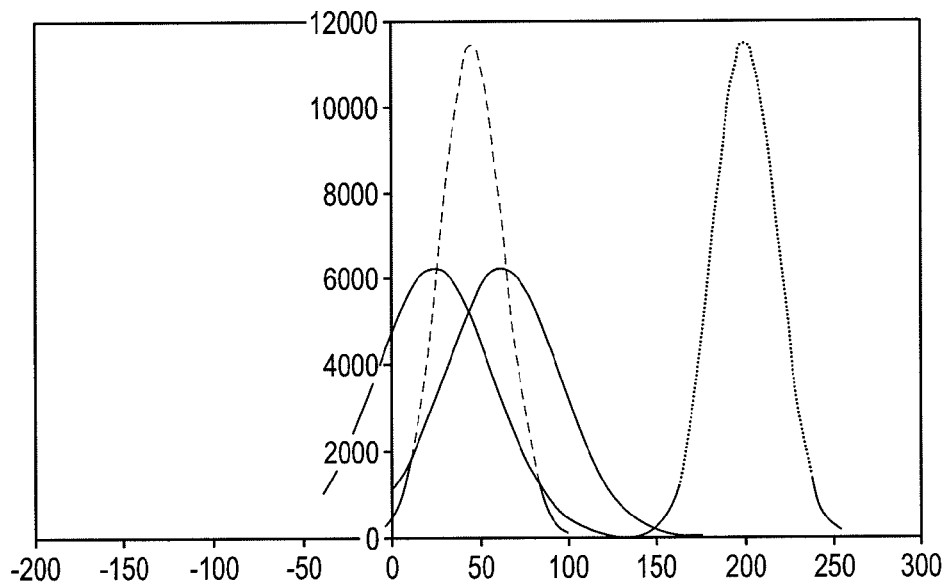
FIG. 10a shows original and translated Gaussians.
Figure 10B:
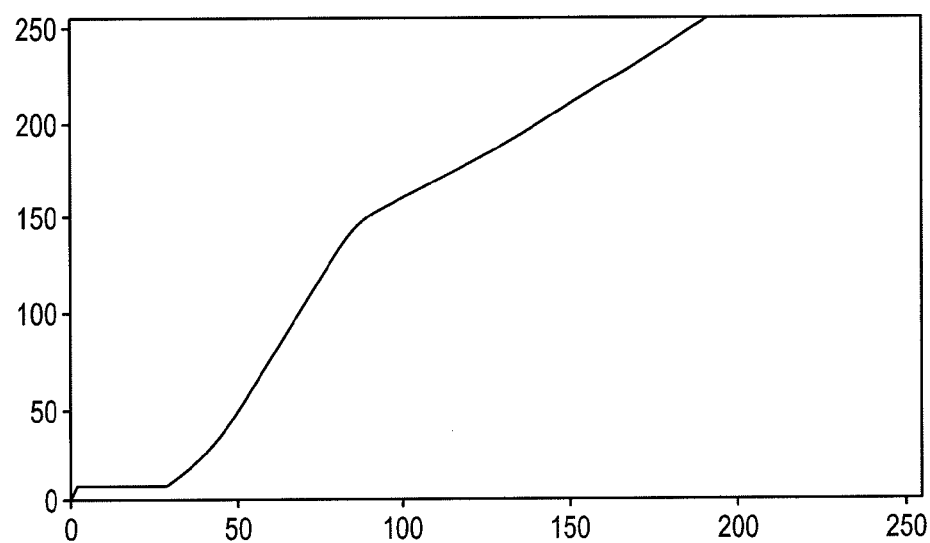
FIG. 10b shows a look-up table (transfer function) computed using the translated Gaussians of FIG. 10a in accordance with the present invention.

As discussed above, the image enhancement is carried out using transfer function equation 9-3, or equation 11-1 in another implementation discussed below. However, the computed LUT cannot be directly applied to the Y channel, since it is a transfer function that relates log Y values with enhanced log Y values. Accordingly, an inverse log transform is applied to the transfer function before it can be applied to the image. The inverse log transform is performed using a transfer function that is the inverse of equation (7), shown in step S4 above. FIG. 10a shows original Gaussians along with translated ones; the originals are shown as a dashed line while the translated are shown as a solid line. The transfer function resulting from these translated Gaussians is also shown in FIG. 10b. This translation does not result in change in shape or height of the Gaussians as the standard deviations of individual Gaussians have not been altered.

The translation of Gaussians discussed above is the preferred implementation for enhancement of low light images. However, alternate adjustments of Gaussians for illumination normalization are possible. One such approach is to translate all such Gaussians to a common luminance value (preferably 127). Such an implementation is not always visually appealing, but it is useful wherever the illumination normalization is used as a preprocessing step for subsequent high level image processing applications such as motion detection, object recognition, etc. Under this implementation, the transformed gray values in the image are given by, $$f(x) = x + 127 - t \quad (11\text{-}1)$$

$$t = \sum_{i=1}^{K} p_i(x)\mu_i \quad (11\text{-}2)$$

Step S8: Transformation from YCbCr Color Space to RGB Color Space

In step S8, the transformation from $YC_bC_r$ color space to RGB color space is performed using equations (2-1), (2-2), and (2-3), shown above.

Partitioning or Quad Based Image Enhancement

Figure 11:
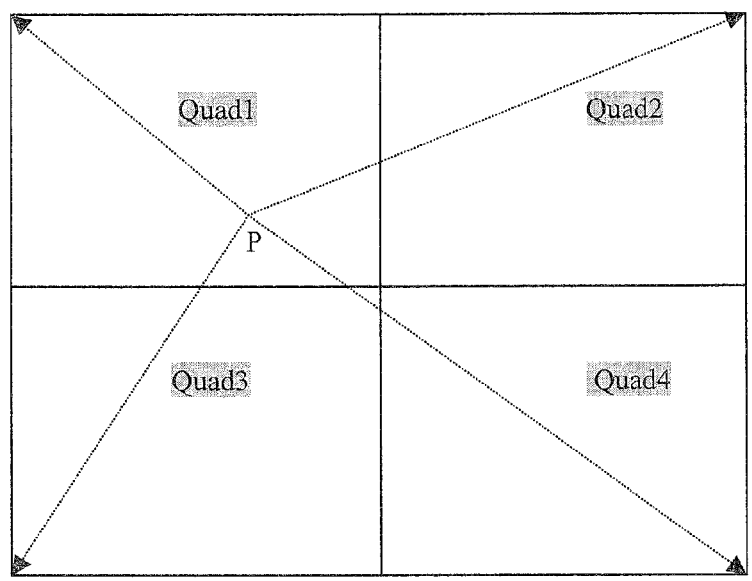
FIG. 11 shows the geometry of four quads.

For certain scenes it is clear to someone skilled in the art that certain zones are darker or brighter than the rest of the scene. In a preferred method for such a scene, the image is divided into four quadrants and an enhancement LUT is computed separately for each quadrant. During enhancement, the four possible output enhanced Y values are computed for each pixel using these four LUTs. The final enhanced value of the pixel is computed using a bilinear interpolation of the four transformed values. The relative weight of each of these enhanced values is inversely proportional to its distance from the quad center. However, from a computational perspective, a more efficient mechanism for weight calculation based on the pixel and line number of the pixel can be used and is discussed below. The geometry of four quads in an image is shown in FIG. 11.

The final enhanced Y value of a pixel in the quad based approach is given by, $$Y_{ij}' = [(r-i)(c-i)Y_{ij}^1 + (r-+i)jY_{ij}^2 + i(c-j)Y_{ij}^3 + ijY_{ij}^4]/(r \cdot c) \quad (12)$$

where, $Y_{ij}"$ is the enhanced value for the nth quadrant for input luminance value $Y_{ij}$ at (i,j) pixel location; and r and c are the number of rows and columns present in the image.

Figure 12:
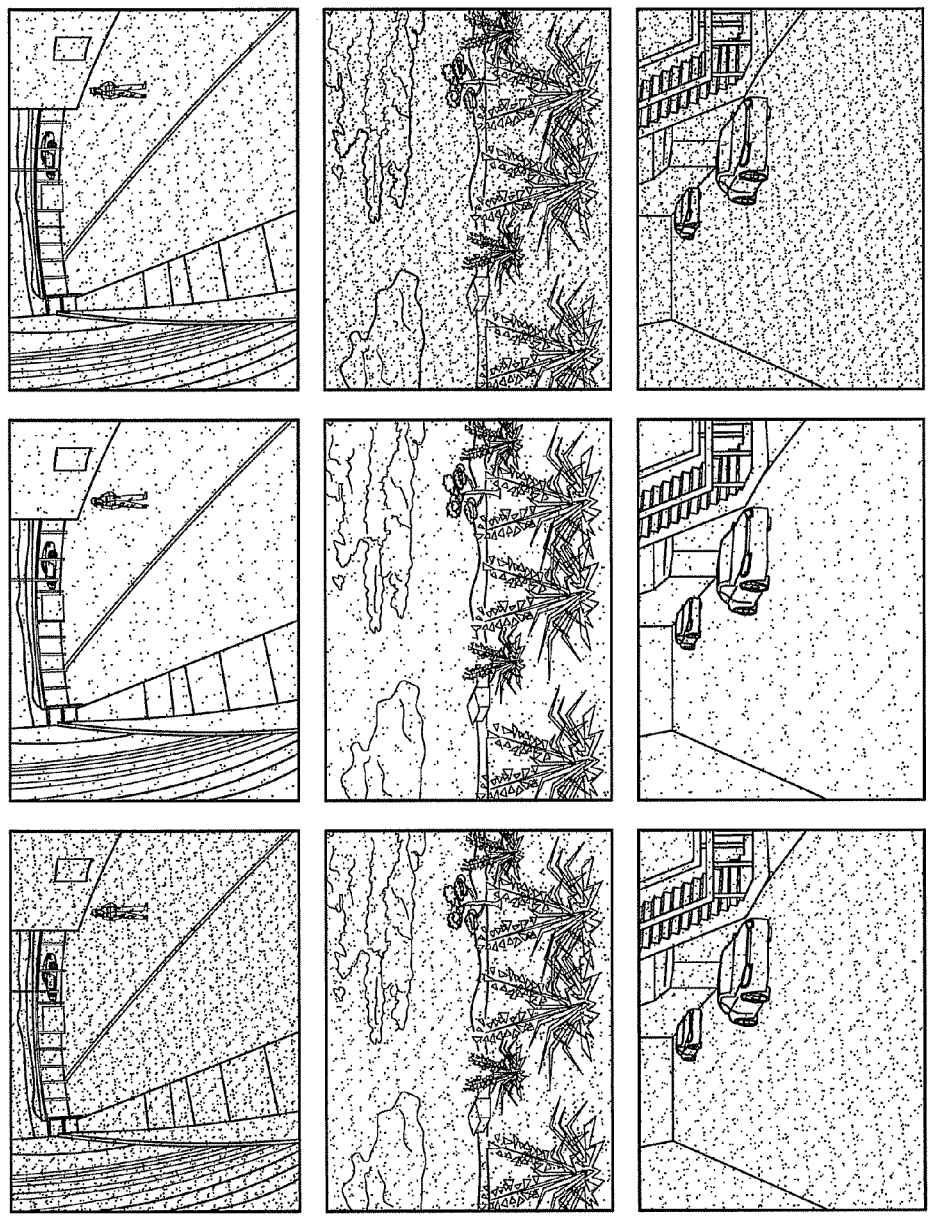
FIG. 12 shows original and enhanced images.

The quad based approach is more effective in terms of enhancement when the scene has a skewed brightness distribution, i.e. one or more quadrants is darker and/or brighter than the rest of the scene. However, a quad based approach is more susceptible to flicker, because skewed brightness may indicate that one of the quadrants is fully occupied by foreground objects. A quad based approach is preferable for digital still camera (DSC) and outdoor wide field of view (FoV) scene enhancement. A non-quad based approach is preferred for indoor scenes with large foreground activity. A set of images enhanced using both quad and non-quad based approaches are shown in FIG. 12. The left column of FIG. 12 shows some low light images and the middle column shows the same images enhanced using non-quad based GMM enhancement. The right column shows the images in the left column enhanced using quad based GMM.

The objective of image contrast enhancement is to achieve better visualization, which is a function of the human visual process. Hence, an objective quantitative evaluation of contrast enhancement is difficult. In fact, if such criteria for enhancement are known, one can always optimize these criteria to achieve the best enhancement algorithm. However, the common approach for evaluation of contrast enhancement algorithm has been subjective evaluation. The other quantitative measures used for evaluation of contrast enhancement schemes are edge count, edge density, and entropy.

Any scene consists of multiple sources of illuminations that are seamlessly blended across the scene. Most of the existing prior art follow a discriminative approach to identify these distinct brightness zones. Such approaches are not able to take into account the seamless blending aspect of luminance sources. The inventive system and method adopts a generative model that take into account an additive model for various luminance sources.

The algorithm is suitable for integration with video products operating in low light conditions as a supplement to existing gamma correction algorithms. The inventive system and method can be put in a video streamer to enhance input video from any camera. The algorithm can be used to provide an enhanced view of an archived video data set. In general, the algorithm can be used for any hand device having a vision interface, e.g. mobile phone with camera, night-vision system in automobile, etc.

An important strength of the inventive GMM enhancement system and method is in getting rid of unused brightness zones, dimming bright spots and lightening of dark zones. The nature of transfer function depends completely on image brightness distribution and can range from a piece-wise linear function to a near gamma curve. The inventive system and method addresses deficiencies in the state of the art by maintaining color constancy, and avoiding frame to frame flicker and artifacts. The computational load is further reduced by computing the enhancement LUT sparingly rather than for every frame.

The invention can be implemented as computer software or a computer readable program for operating on a computer. The computer program can be stored on computer readable medium.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for enhancing an image from an initial image comprising the steps of:
    (a) computing a first luminance level frequency distribution corresponding to a plurality of pixels constructing said initial image;
    (b) representing said first luminance level frequency distribution as a resultant of Gaussian model mixtures to assess relative utilization of overall luminance level across said initial image;
    (c) computing a desired luminance level frequency distribution as a function of the relative utilization;
    (d) computing a transfer function to adjust the first luminance level frequency distribution to an enhanced luminance level as a function of desired level frequency distribution estimation; and
    (e) applying said transfer function globally to said initial image to provide an enhanced image.

2. The method of claim 1, wherein said first luminance level is adapted to be linearized in a logarithmic form.

3. The method of claim 1, wherein said model comprises one or more Gaussian functions.

4. The method of claim 1, wherein said initial image is a background image estimated from a sequence of images.

5. The method of claim 1, further comprising computing a plurality of transfer functions corresponding to each of a plurality of pixel zones.

6. The method of claim 5, wherein each of said plurality of transfer functions are applied globally to said initial image to provide a plurality of interim enhanced images.

7. The method of claim 6, wherein said interim enhanced images are blended to provide the enhanced image.

8. A computer readable medium having computer readable program for operating on a computer for enhancing an image from an initial image, said program comprising instructions that cause the computer to perform the steps of:
    (a) computing a first luminance level frequency distribution corresponding to a plurality of pixels constructing said initial image;
    (b) representing said first luminance level frequency distribution as a resultant of Gaussian model mixtures to assess relative utilization of overall luminance level across said initial image;
    (c) computing a desired luminance level frequency distribution as a function of the relative utilization;
    (d) computing a transfer function to adjust the first luminance level frequency distribution to an enhanced luminance level as a function of desired level frequency distribution estimation; and
    (e) applying said transfer function globally to said initial image to provide an enhanced image.

9. The computer readable medium of claim 8, wherein said first luminance level is adapted to be linearized in a logarithmic form.

10. The computer readable medium of claim 8, wherein said model comprises one or more Gaussian functions.

11. The computer readable medium of claim 8, wherein said initial image is a background image estimated from a sequence of images.

12. The computer readable medium of claim 8, further comprising computing a plurality of transfer functions corresponding to each of a plurality of pixel zones.

13. The computer readable medium of claim 12, wherein each of said plurality of transfer functions are applied globally to said initial image to provide a plurality of interim enhanced images.

14. The computer readable medium of claim 13, wherein said interim enhanced images are blended to provide the enhanced image.

* * * * *